United States Patent [19]

Olsson

[11] 4,277,639
[45] Jul. 7, 1981

[54] HIGH-VOLTAGE INSTALLATION INCLUDING HEAVY ELECTRICAL APPARATUS SUSPENDED BY INSULATOR MEANS

[75] Inventor: Karl E. Olsson, Ludvika, Sweden

[73] Assignee: ASEA Aktiebolag, Sweden

[21] Appl. No.: 131,345

[22] Filed: Mar. 19, 1980

[30] Foreign Application Priority Data

Mar. 27, 1979 [SE] Sweden .............................. 7902707

[51] Int. Cl.³ .................... H01F 27/06; H02B 1/18; H02B 5/04
[52] U.S. Cl. ...................................... 174/42; 174/43; 248/562; 248/610; 336/68; 361/332
[58] Field of Search ............... 174/40 R, 42, 43, 45 R, 174/148, 149 R, 150; 336/68; 361/331, 332, 333, 334, 376; 248/317, 562, 565, 610, 613, 636

[56] References Cited

U.S. PATENT DOCUMENTS

| 3,358,220 | 12/1967 | Fahlen et al. ..................... 174/150 X |
| 3,726,986 | 4/1973 | Higaki et al. .......................... 174/43 |

FOREIGN PATENT DOCUMENTS

| 262411 | 6/1968 | Austria ............................... 174/149 R |
| 918317 | 2/1963 | United Kingdom |

Primary Examiner—Laramie E. Askin
Attorney, Agent, or Firm—Pollock, Vande Sande & Priddy

[57] ABSTRACT

A high-voltage installation comprises a support structure including a supporting member from which at least one electrical high-voltage apparatus, for example a transformer or inductor, is suspended. The apparatus is suspended from the supporting member by at least one electrically-insulating suspension member, for example an insulator chain, which includes resilient means allowing relative movement between the apparatus and the supporting member.

8 Claims, 3 Drawing Figures

HIGH-VOLTAGE INSTALLATION INCLUDING HEAVY ELECTRICAL APPARATUS SUSPENDED BY INSULATOR MEANS

TECHNICAL FIELD

This invention relates to a high-voltage installation comprising at least one electrical high-voltage apparatus, for example a transformer or an inductor.

Sometimes, heavy electrical apparatus has to be installed so that it is electrically insulated from its base, which is usually located at ground potential. One example is a smoothing reactor for high-voltage direct current. Another example is cascade transformer equipment for generation of high voltage alternating current, in which a series of transformers are located at a successively higher voltage relative to ground.

BACKGROUND ART

Up to now it has been common, in such cases, to mount the apparatus on supporting insulators, usually of porcelain or other ceramic material. When there are high voltages to ground, the supporting insulators must be long and are therefore subjected to heavy buckling stresses because of the heavy apparatus that may be used. This problem is particularly pronounced if the base for the installation is not completely immobile but is able to move. This may be the case when the apparatus is installed within a seismic area or on a marine installation, for example an oil drilling platform. In these cases the stresses on the insulators may become so high that the installation becomes very complicated and expensive, or quite impossible to carry out.

The above-mentioned problem is particularly pronounced in the case of apparatus operating at voltages exceeding 100 kV, and when using heavy apparatus weighing in excess of 10 tons.

The present invention aims to provide a high-voltage installation comprising at least one electrical high-voltage apparatus in which the use of brittle and expensive supporting insulators may be completely avoided, thus obtaining an installation which is relatively insensitive to possible movements of the base of the apparatus. The invention particularly aims to provide such an installation comprising apparatus operating at voltages exceeding 100 kV and weighing in excess of 10 tons.

DISCLOSURE OF INVENTION

According to the invention, a high-voltage installation comprises a support structure including a supporting member from which at least one electrical high-voltage apparatus is suspended by means of at least one electrically insulating suspension member, said at least one suspension member comprising resilient means allowing relative movement between said apparatus and said supporting member.

BRIEF DESCRIPTION OF DRAWING

The invention will now be described, by way of example, with reference to the accompanying drawing, in which.

DESCRIPTION OF PREFERRED EMBODIMENT

Figure 1A:
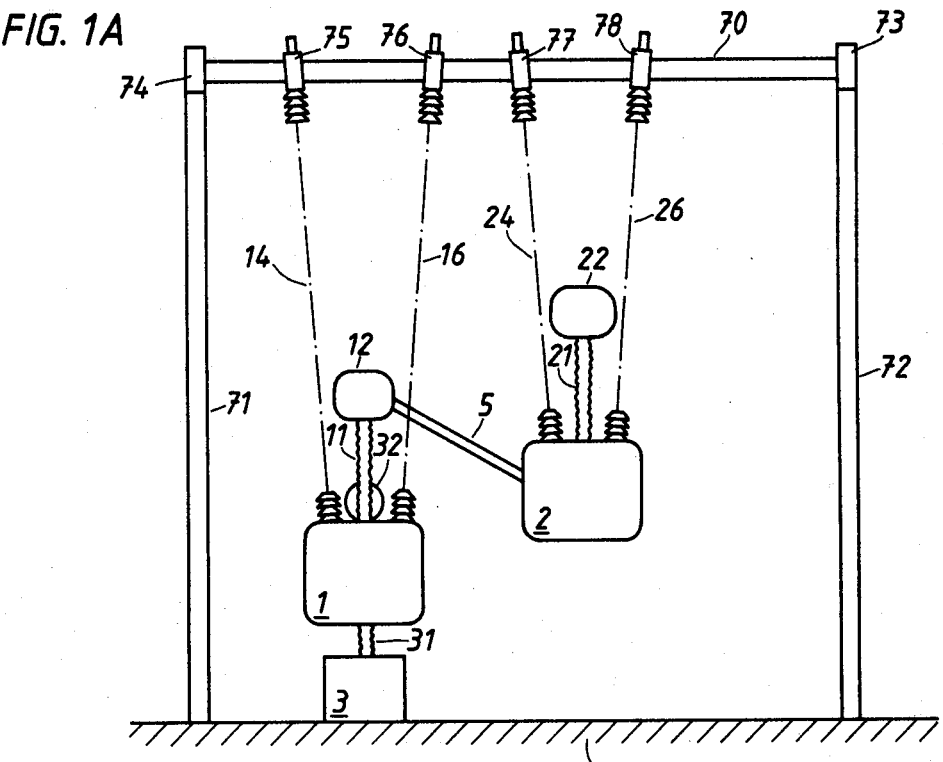
FIG. 1A is a front elevational view of one embodiment of a high voltage installation in accordance with the invention.
Figure 1B:
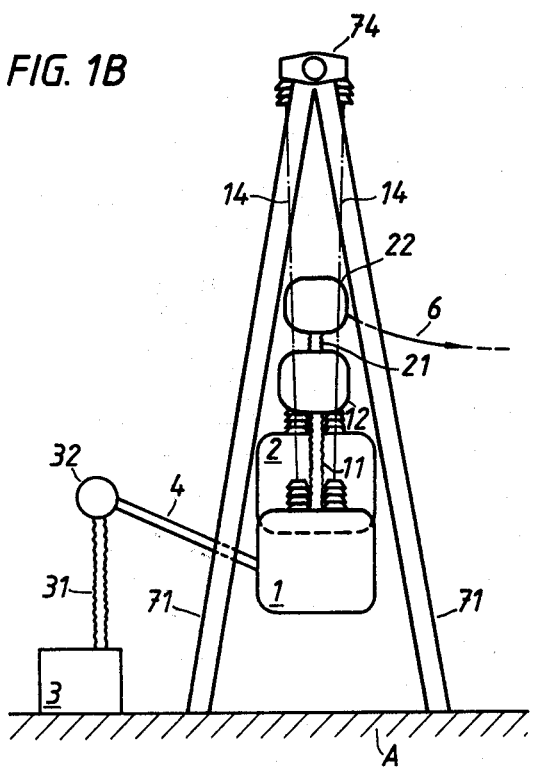
FIG. 1B is a side view of the installation of FIG. 1A.

FIGS. 1A and 1B show an installation comprising three transformers 1, 2 and 3 in cascade arrangement. Of these, transformer 3 is positioned at ground potential and supplies transformer 1, which is positioned at a high voltage relative to ground, which in turn supplies transformer 2 which is positioned at an even higher voltage. Transformer 3, which is mounted directly on a base A or on a suitable foundation, has a connecting means consisting of a corona shield 32 mounted on an insulator 31.

The transformers 1 and 2 suspended from a support structure consisting of a trestle, for example of metallic tubes, having two pairs of legs 71, 72 and a supporting member in the form of horizontal upper transversal beam 70. Mechanical interconnecting means 73 and 74 are provided at each end of the support structure for securing each pair of legs and the beam 70 to each other. Yokes 75–78 are mounted on the beam 70, each yoke having two attachment points. Transformer 1 is suspended from two pairs of insulator chains 14, 16, of which the two chains 14 are attached to the yoke 75 and the two chains 16 are attached to the yoke 76. The chains converge in the downward direction, which prevents or counteracts oscillating movements of the transformer. The transformer 3 supplies the transformer 1 via a connection member 4, which is suitably made with a certain amount of flexibility so that it may take up slight relative movements between the transformers 1 and 3.

The transformer 1 has an electrical connection means consisting of a corona shield 12 mounted on an insulator 11.

In the same way as the transformer 1, the transformer 2 is suspended from yokes 77 and 78 by means of two pairs of insulator chains 24, 26. The tranformer has a corona shield 22, mounted on an insulator 21, which constitutes the electrical connection means of the transformer. The voltage from transformer 2 is taken out through a connection member 6.

The transformer 1 supplies the transformer 2 via a connection member 5. The connection members 5 and 6 are suitably given a certain degree of flexibility to be able to take up relative movements between the individual transformers and movements relative to the base.

The connection members 4, 5 and 6 may in their simplest form consist of loose lines, which provides the suitable flexibility. Alternatively, they may consist of jointed or resilient rods or tubes. Possibly, some or all of the connections 4, 5, 6 may consist of conductors which are arranged in tubes filled with sulphur hexafluoride gas. The tubes (and the conductors) are then given a suitable flexibility by using bellows, joints, or the like.

Figure 2:
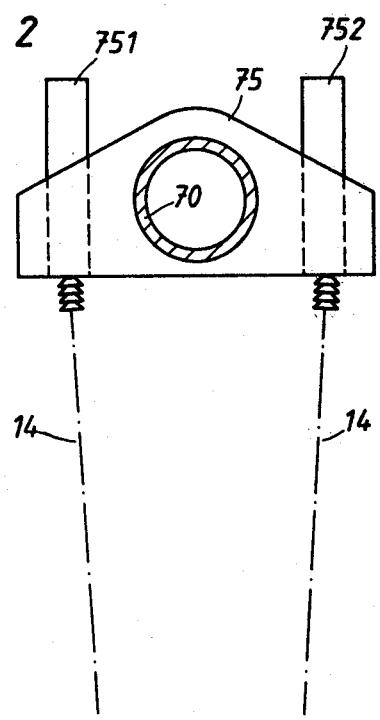
FIG. 2 is a detail, on an enlarged scale, of the installation of FIGS. 1A and 1B.

FIG. 2 shows how the yoke 75, which supports the insulator chains 14, may be constructed. The yoke is fixed to and arranged perpendicular to the beam 70. The two chains 14 are fixed to the yoke by way of resilient and damping members 751 and 752, respectively. The members 751 and 752 may be constructed in many ways. For example, they may consist of spring elements with, for example, rubber springs, cup springs or screw springs, which are provided with damping members, for example of a hydraulic or pneumatic type. This gives the suspension a certain resilience for vertical and horizontal relative movements as well as oscillating movements between the transformer and the support structure, which considerably reduces the stresses on the suspension. The damping members attenuate the oscillations of various kinds which the transformer is capable of performing relative to the base and the support structure. The yokes 76, 77 and 78 are designed in the same way as the yoke 75.

Because each of the transformers 1, 2 is suspended from several insulator chains, an increased stability in the suspension is obtained as well as increased safety and reliability in the case of rupture or damage to any of the chains.

Because the insulator chains from which a transformer is suspended converge in the downward direction, an efficient damping of horizontal relative movements between the transformer and the supporting beam 70 is obtained (in connection with the resilient and movement-damping members 751, 752).

The insulator chains, from which the transformers are suspended, may be conventional, heavily dimensioned suspension insulator chains, and the number of chains used to suspend each transformer may be greater than, or less than the four shown in the drawing.

Instead of insulator chains, at least for indoor installation, other members could be used, for example rods or tubes of, for example, glass-fibre laminate or possibly lines of insulating material.

The support structure itself may, of course, be constructed in many ways other than that described above. Instead of using tubes, the legs and the upper transversal beam may, for example, be of lattice construction. The support structure may possibly completely or partially consist of a part or of parts included in a plant, building, or the like, provided said parts have sufficient strength.

The electrical connections to the apparatus may possibly be constructed so as to comprise members for damping movements of the apparatus.

As will be clear from the above description, in an installation in accordance with the invention the previously necessary supporting insulators are completely eliminated. The insulator chains or comparable members used in an installation in accordance with the invention will only be subjected to pure tensile stresses, and may therefore be given the desired strength in a simple manner. As shown, the installation may, in a simple manner, be given a certain flexibility, which further contributes to reduce the stresses on the components included in the installation.

What is claimed is:

1. A high-voltage installation comprising an electrical high-voltage apparatus with a weight exceeding 10 tons and an operating voltage exceeding 100 kV, and a support structure including a supporting member from which said high-voltage apparatus is suspended by means of a plurality of elongated electrically insulating suspension members, each suspension member being attached to said supporting member through resilient means for allowing relative movement between said apparatus and said supporting member in the longitudinal direction of said suspension members.

2. An installation according to claim 1, in which each of said plurality of electrically insulating suspension members comprises an insulator chain.

3. An installation according to claim 1 or 2, in which said apparatus is provided with flexible electrical connection means.

4. An installation according to claim 1 or 2, in which said suspension members are provided with damping means for damping oscillating movements of the apparatus.

5. An installation according to claim 1 or 2, in which said support structure comprises a trestle having legs and an upper transversal beam.

6. An installation according to claim 1 or 2, in which said resilient means is combined with damping means for damping movements of said apparatus relative to said supporting member.

7. An installation according to claim 1, in which said suspension members are converging downwards.

8. A high-voltage installation according to claim 1, in which said suspension members are converging downwards and are attached to spaced-apart points on the apparatus, and in which each suspension member is attached to the supporting member through said resilient means, and damping means for damping relative movement between said suspension members and the supporting member in the longitudinal direction of the suspension members.

* * * * *